United States Patent
Kotrla et al.

(10) Patent No.: US 8,520,547 B2
(45) Date of Patent: Aug. 27, 2013

(54) SYSTEM AND METHOD FOR MEASURING INTERFACE UTILIZATION USING POLICERS

(75) Inventors: Scott R. Kotrla, Wylie, TX (US); Christopher N. DelRegno, Rowlett, TX (US); Matthew W. Turlington, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/438,612

(22) Filed: Apr. 3, 2012

(65) Prior Publication Data

US 2012/0188872 A1    Jul. 26, 2012

Related U.S. Application Data

(63) Continuation of application No. 12/262,743, filed on Oct. 31, 2008, now Pat. No. 8,208,395.

(51) Int. Cl.
*H04J 1/16*    (2006.01)

(52) U.S. Cl.
USPC ............................................. 370/252

(58) Field of Classification Search
USPC ................ 370/252, 253, 232, 233, 234, 241, 370/465, 468, 235, 230, 414, 412, 417, 418, 370/428, 230.1, 429, 231; 709/223, 235, 709/224, 222, 226, 237
See application file for complete search history.

(56) References Cited

U.S. PATENT DOCUMENTS

| | | | |
|---|---|---|---|
| 5,867,483 A | 2/1999 | Ennis, Jr. et al. | |
| 6,381,214 B1 | 4/2002 | Prasad | |
| 6,826,150 B1 | 11/2004 | Bhattacharya et al. | |
| 6,917,590 B1 | 7/2005 | Oliva | |
| 7,023,799 B2 | 4/2006 | Takase et al. | |
| 7,054,269 B1 | 5/2006 | Luguern et al. | |
| 7,236,461 B1 | 6/2007 | Sonti et al. | |
| 7,388,837 B1 | 6/2008 | St-Denis et al. | |
| 7,580,352 B2 * | 8/2009 | Iwata et al. | 370/230 |
| 2006/0098572 A1 | 5/2006 | Zhang et al. | |
| 2007/0177504 A1 | 8/2007 | Iwata et al. | |
| 2007/0263535 A1 | 11/2007 | Shabtay | |
| 2008/0144632 A1 | 6/2008 | Rabie et al. | |

FOREIGN PATENT DOCUMENTS

EP    1585265    10/2005

OTHER PUBLICATIONS

Extended European Search Report dated Mar. 5, 2012, issued in corresponding EPO case.

* cited by examiner

*Primary Examiner* — Chi Pham
*Assistant Examiner* — Alexander O Boakye (57) ABSTRACT

An approach is provided for monitoring interface utilization. Bandwidth data for an interface is collected during a configurable time interval, and a peak utilization of the interface over the time interval is determined using a plurality of incremented policers to measure the collected bandwidth data. An implementation of which is system that includes a monitoring module configured to collect bandwidth data for an interface over a configurable time interval, a plurality of incremented policers configured to measure the collected bandwidth data, and an analysis module configured to determine a peak utilization of the interface over the time interval using the measurements of the plurality of incremented policers.

20 Claims, 5 Drawing Sheets

SYSTEM AND METHOD FOR MEASURING INTERFACE UTILIZATION USING POLICERS

CROSS REFERENCE TO RELATED APPLICATIONS

This application is a continuation of U.S. application Ser. No. 12/262,743 filed Oct. 31, 2008, the entirety of which is incorporated herein.

BACKGROUND INFORMATION

Modern communication networks are growing in size and complexity. As the number of consumers increases and services evolve in sophistication, the performance of these networks can degrade, in part, from link and pathway congestion. During information transport, link and pathway congestion customarily results in transmitted units of data (e.g., blocks, cells, frames, packets, etc.) becoming unevenly distributed over time, excessively queued, and discarded, thereby degrading the quality of network communications. Unfortunately, current techniques for analyzing network traffic are proving ineffective against bursty, transient patterns of traffic.

Therefore, there is a need for an approach that provides accurate, effective network traffic analysis.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for measuring interface utilization are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to packet-switched networks, it is contemplated that various exemplary embodiments are applicable to other transport environments, and technologies.

Figure 1:
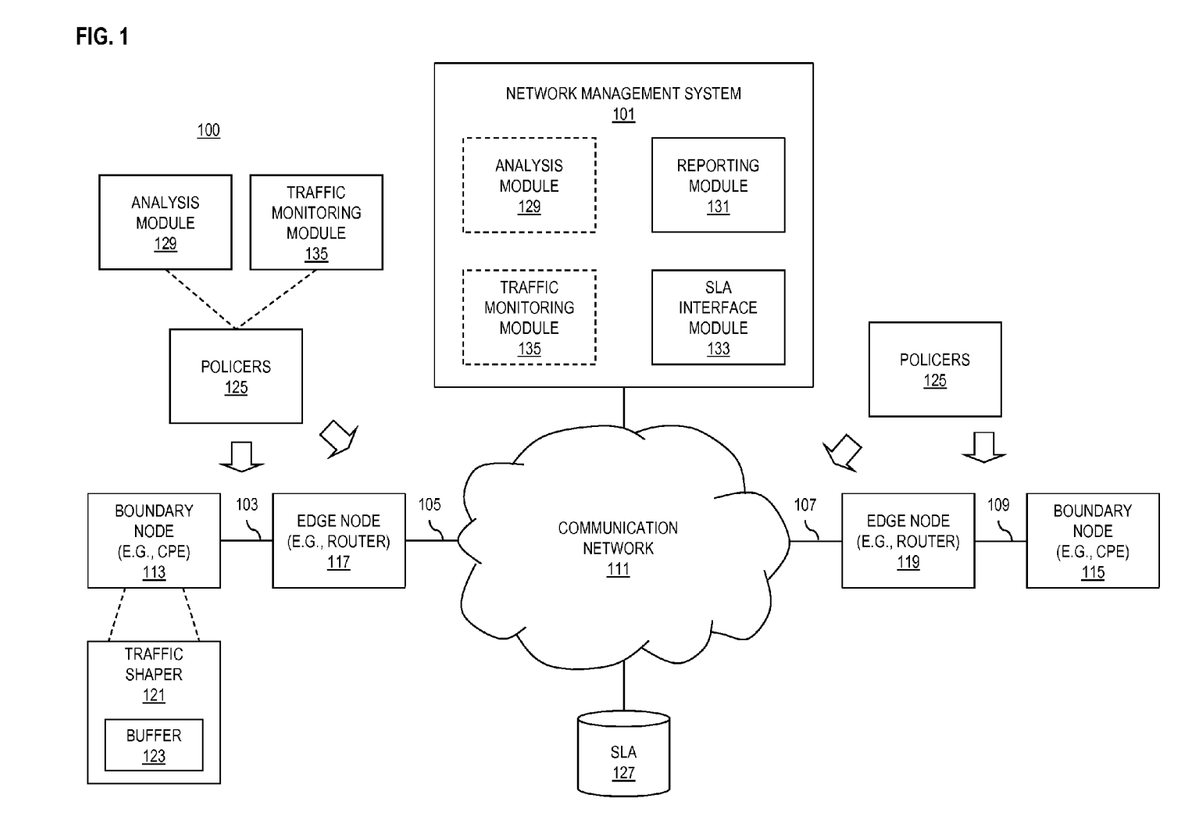
FIG. 1 is a diagram of system capable of measuring interface utilization, according to an exemplary embodiment.

FIG. 1 is a diagram of system capable of monitoring and analyzing network traffic, according to an exemplary embodiment. For the purposes of illustration, a system 100 is described with respect to a network management system 101 configured to monitor and analyze network traffic related to one or more connections (e.g., links, pathways, etc.) 103-109, 105, 107, and 109 corresponding to one or more communication networks (or transport environments) 111. By way of example, communication network 111 may be a packet-switched (e.g., Internet Protocol (IP) based) network configured for the transport of information (e.g., data, voice, video, etc.) between one or more sources (e.g., boundary node 113) and one or more destinations (e.g., boundary node 115). While specific reference will be made thereto, it is contemplated that system 100 may embody many forms and include multiple and/or alternative components and facilities.

To assist with traffic engineering, service providers negotiate and apportion network capacity on general or subscriber-specific bases through service level agreements (SLA). These agreements define various communication service parameters in terms of bandwidth allocations. As such, network administrators require policing mechanisms to monitor and analyze network traffic on an ongoing basis, as well as ensure subscriber conformance with provisioned rates of service.

As previously mentioned, units of data (e.g., blocks, cells, frames, packets, etc.) transmitted across a transport environment are typically "policed" according to one or more committed rates of service, such as a committed burst bandwidth. These committed rates of service are generally associated with particular connection(s), e.g., links, pathways, etc., or other network parameters, e.g., incoming/outgoing interface, destination/source node, machine access control address, etc. For example, when gathered into one or more service level agreements (SLA), committed rates of service offer transmitting entities (e.g., clients, equipment, providers, other networks, users, etc.) a framework by which to "ready" (or shape) traffic for transmission. It is noted that traffic shaping techniques are utilized by transmitting entities to delay metered traffic in order to bring transmissions into conformance with the constraints imposed by a carrier network. In turn, service providers police traffic, i.e., monitor proposed transmissions on an ongoing basis, to ensure that a transmitting entity is, in fact, conforming to their SLA committed rates of service. Traffic policing can occur at the "edge" or at the "boundary" of a carrier network to limit the rate at which traffic enters or leaves the network. When a transmitting entity exceeds an SLA parameter, such as a committed burst length (or size), the carrier network is typically permitted to "drop" the excess units of data or, in some instances, "carry" them on a best effort (or lower quality of service) basis. However, if a committed rate of service is not sufficiently negotiated, policing mechanisms are too aggressively imposed, or shaping mechanisms are too leniently applied, network performance will be degraded. As such, traffic monitoring and analyzing is becoming an ever more critical component of effective traffic management.

Traditionally, service providers have monitored and analyzed network traffic through aggregation techniques that average this traffic over "large" time intervals. This causes the more "temporal," yet significant bursts of traffic to go undetected and, consequently, unmanaged. Therefore, the system 100 provides an approach, according to certain embodiments, that stems from the recognition that by reducing the coarse time granularity for monitoring and analyzing network traffic, service providers will be able to more effectively detect and manage bursts of network traffic.

As seen in FIG. 1, network management system 101 is configured to monitor, analyze, and report on network traffic originating from at least one source (e.g., boundary node 113) for transmission to at least one destination (e.g., boundary node 115) via one or more communication networks 111. Boundary nodes 113 and 115 access communication network 111 via one or more edge nodes (e.g., edge node 117 and 119, respectively) by way of connections 103, 105, 107, and 109. While not illustrated, data units (e.g., blocks, cells, frames, packets, etc.) transported over communication network 111 and, thereby, between edge nodes 117 and 119, may traverse one or more other connections and/or nodes of communication network 111.

In this manner, boundary nodes 113 and 115 represent suitable customer premise equipment (CPE). That is, boundary nodes 113 and 115 may be routers, servers, switches, terminals, workstations, etc., of a client (or subscriber). It is contemplated that boundary nodes 113 and 115 may communicate multiple flows of traffic originating from one or more users (not shown) of, for example, an enterprise (or otherwise private) network of a client. Similarly, edge nodes 117 and 119 may represent suitable routers, servers, switches, terminals, workstations, etc., of a service provider of, for example, communication network 111. In exemplary embodiments, communication network 111 may correspond to suitable wired and/or wireless networks providing, for instance, a local area network (LAN), metropolitan area network (MAN), wide area network (WAN), or combination thereof. Communication network 111 may correspond to a backbone network of a service provider. As such, communication network 111 may operate as an asynchronous transfer mode (ATM) network, frame relay network, integrated services digital network (ISDN), internet protocol (IP) network, multiprotocol label switching (MPLS) network, or synchronous optical networking (SONET) network, as well as any other suitable network, or combination thereof.

MPLS provides for efficient transport of traffic flows between different hardware platforms as well as different applications. Traffic engineering, within an MPLS network, is provided through the use of label switched paths (LSPs), which are created independently based on user-defined policies. Data transmission over an MPLS system involves the establishment of LSPs, which are a sequence of labels stemming from every node within the communication path from a source node to a destination node.

According to various embodiments, boundary nodes 113 and 115 include traffic shapers (e.g., shaper 121) configured to delay metered traffic according to one or more deterministic constraints (or rates of service), such as a maximum burst length (or size), maximum burst rate, sustainable burst length, sustainable burst rate, etc. It is noted that these traffic variables may be defined in terms of, for example, bandwidth allocations. Traffic shaping functions may be implemented by shaper 121 through one or more buffers (e.g., buffer 123) that temporarily "hold" and/or "schedule" units of data for transmission so that traffic shaper 121 can disperse traffic as bandwidth becomes available on an outgoing connection, such as connection 103. Shaper 121 can be configured to disperse traffic so that transmitted units of data (e.g., one or more blocks, cells, frames, packets, etc.) so that traffic does not exceed dedicated bandwidth by using information measured by policers 125.

In the system 100 depicted in FIG. 1, policers 125 can reside on anyone or more interfaces shown in the network 100 (e.g. either side of links 103,105,107,109), for monitoring any logical grouping of traffic desired (e.g., physical port, queue on a physical port, sub-interface, a communication path (e.g., label switched path (LSP)), a data flow (e.g., customer flow), etc.). Policers 125 at interface 103, for instance, can be used to measure traffic. For example, policers 125 are used to measure interface utilization in order to control access to communication network 111 based on one or more committed rates of service stored to a service level agreement (SLA) repository 127 or a local memory of (or accessible by) the policers. A multiple-policer bandwidth measurement algorithm could be used to more accurately measure interface bandwidth. Such measurements can thus be utilized to output bandwidth reports; these reports can compared with customers' SLAs.

By way of example, network management system 101 may comprise computing hardware (such as described with respect to FIG. 5) configured to execute the processes described herein. In one implementation, network management system 101 includes analysis module 129, reporting module 131, SLA interface module 133, and traffic monitoring module 135. It is contemplated, however, that network management system 101 may embody many forms and include multiple and/or alternative components or configurations. For example, it is contemplated that one or more components of network management system 101 may be combined, located in separate structures, or separate physical locations. In other words, a specific topology is not critical to embodiments of network management system 101 or system 100 for that matter. Moreover, the analysis module 129 and traffic monitoring module 135 can reside in the boundary nodes (e.g., node 113) as part of the policers 125; this arrangement can enhance scalability.

The measured traffic rates or statistics generated by analysis module 129 may be provided to reporting module 131 for generating one or more traffic reports. According to certain embodiments, the network traffic reports are made available to network administrators and/or pertinent clients. For example, a traffic report may be generated by reporting module 131 and provided to a client in the form of an electronic mailing, facsimile transmission, or postal mailing. In other embodiments, a traffic report is accessible via a networked application (e.g., website). For instance, a traffic report may be "viewed" or "downloaded" by a client via an online graphical user interface (GUI) hosted by, for example, network management system 101. Accordingly, network administrators via network management system 101 can determine which one or more of the traffic variables require attention or modification. While not illustrated, network management system 101 may also interface, either directly or via one or more networks (e.g., communication network 111), with a billing system in order to generate client invoices. Invoice generation may be based on one or more of the measured traffic rates, traffic statistics, SLA conformance determinations, or other suitable datum.

Measuring peak interface utilization is an important part of managing and planning packet networks. Traditionally, this is executed by regularly collecting packet and byte counters. Changes in packet and byte counters over the measurement period can be used to measure average frame rate and throughput across the interface. While the counters themselves are typically implemented in hardware, the collection of counter data is implemented in software, limiting the speed at which counters can be polled. Typically, statistics can be gathered over a large time interval (e.g., in timeframes of around a minute, which is a very long time) and can smooth out interface utilization peaks that are indicative of impending congestion. For example, a 10GE interface with Constant BitRate (CBR) traffic at 1 Gbps has plenty of room for additional traffic, while a 10GE interface with Variable BitRate (VBR) traffic at line rate for one out of every 10 seconds may effectively be full even though statistics over a 10 second window will show a rate of 1 Gbps that matches that of the interface with CBR traffic. In order to retrieve statistics that can show bursts of traffic that are close to exhausting the buffers on an interface, counters would have to be polled at a rate corresponding to the amount of time needed to drain the buffer at line rate, typically a few hundred ms or less, which is not feasible in most implementations.

Figure 2:
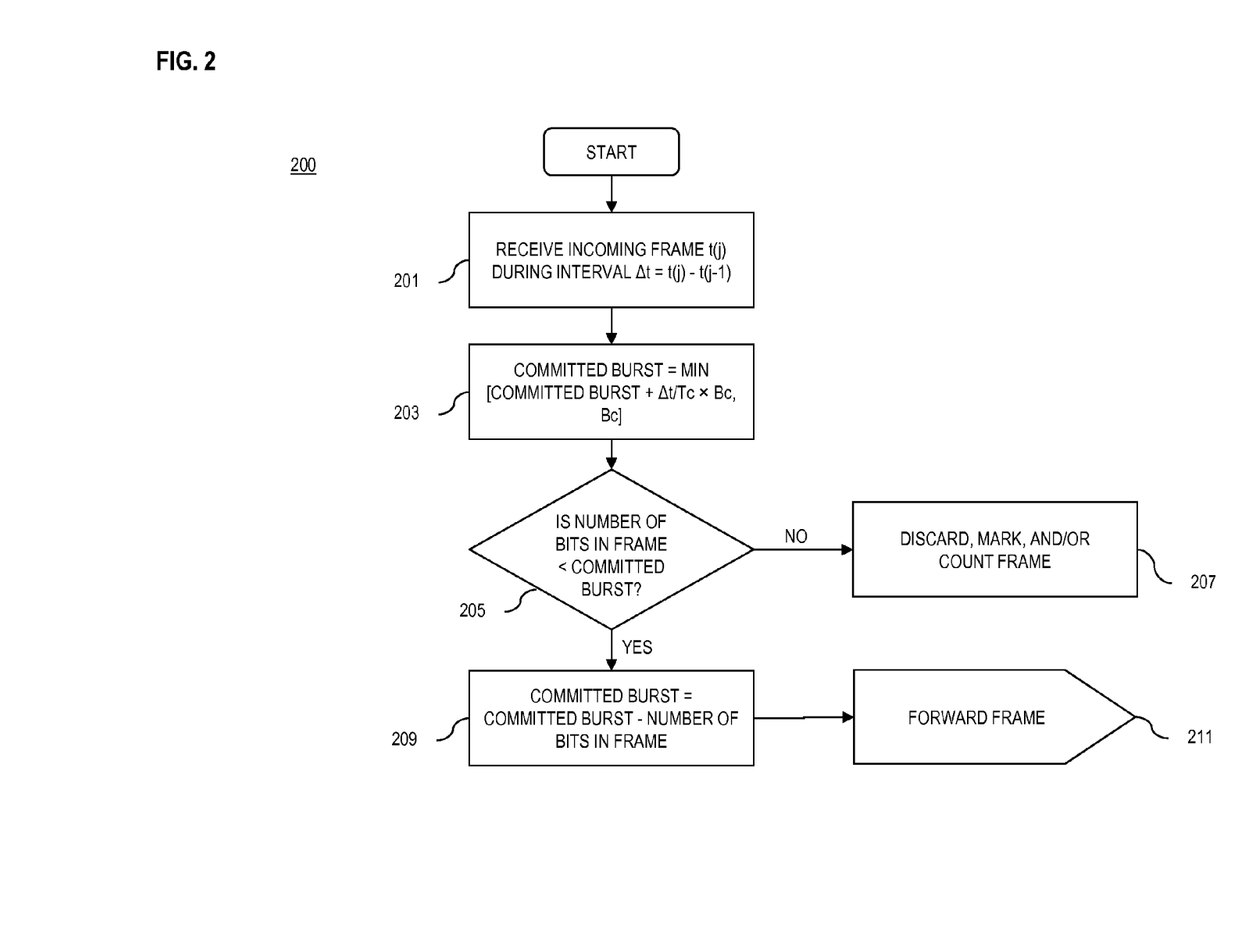
FIG. 2 is a flowchart of an exemplary traffic conditioning algorithm for use in a standard token bucket policer.

FIG. 2 is a flowchart of an exemplary traffic conditioning algorithm for use in a standard token bucket policer. This exemplary algorithm describes an interim Ethernet traffic conditioning recommendation and is more fully described in Appendix II of ITU (International Telecommunication Union) standard G.8011.1, which provides a good reference model for a token bucket policer.

This determines the conformance of the incoming Ethernet frames. The level of conformance is expressed as one of two colors: Green or Red. Compliance for a bandwidth profile is described by two parameters that are associated with two token bucket algorithms. The parameters are: (1) Committed Information Rate (CIR) expressed as bytes per second, where the CIR must be $\geq 0$; and (2) Committed Burst Size (CBS) expressed as bytes, where CBS must be $\geq$ Maximum Ethernet frame allowed to enter the network.

For a sequence of ingress Ethernet frames, $\{t(j), l(j)\} j \geq 0$, with arrival times $t(j)$ and lengths $l(j)$, the color assigned to each frame during traffic conditioning is defined by using the algorithm shown in FIG. 2. For this algorithm, Bc=CBS and Tc=CBS/CIR. Thus, in step 201 an incoming frame $t(j)$ is received during an interval $\Delta t = t(j) - t(j-1)$. In step 203, the committed burst is determined as COMMITTED BURST=Minimum [COMMITTED BURST+$\Delta t$/Tc$\times$Bc, Bc]. Then, in step 205, it is determined whether the number of bits in the frame is less than the committed burst from step 203. If the number of bits in the frame is not less than the committed burst, then the frame is counted, marked as red and/or discarded in step 207. If the number of bits in the frame is less than the committed burst, then, in step 209, the committed burst is set to be equal to the committed burst minus the number of bits in the frame, and the frame is counted, marked as green and/or forwarded in step 211.

In an exemplary embodiment, multiple such policers are used to measure peak utilization of an interface with the action for red packets being to count the bytes and packets instead of discarding them. Using a number, n, of policers, as policers 125 in FIG. 1, allows for measurement granularity of 1/n based on the minimum policer value for which there are no red packets. Policer CIR values would increment at 1/n of the interface speed, while policer CBS values would increment at 1/n of the interface buffer size. Because both buffer size and bandwidth are included in the policer configuration, traffic from two or more interfaces whose peak bandwidths are calculated in this manner and whose sum are less than 100% would be able to share a single interface without any packet loss. In order to capture bursts of traffic that exceed line rate of the interface, the policer measurements should happen before packets are placed into the buffer for transmission.

In order to improve granularity at lower interface utilizations, the bandwidth increment does not have to be symmetric across the entire interface bandwidth. For example, policer increments of 1%, 2%, 3%, 4%, 5%, 10%, 15% and then 10% increments from 20% to 100% can be used to provide detailed information at lower bandwidths with only a small increase in the number of policers. In addition, finer measurement granularity can be achieved by assuming a linear relationship between red packets and peak interface bandwidth across the last bandwidth interval.

Because the policers are calculating the peak bandwidth in hardware, the length of the measurement interval is no longer a bound on the accuracy of the measurement as it was when interface counters were polled. A one minute interval can still provide details on the peak utilization during traffic bursts during millisecond intervals, which will be recorded as red packets.

In addition to making measurements of all traffic traversing an interface, this approach can also be used to measure the bandwidth of one or more individual classes of traffic traversing an interface. Monitoring can be performed for any logical grouping of traffic desired (e.g. physical port, queue on a physical port, subinterface, LSP, customer flow, etc.).

Figure 3:
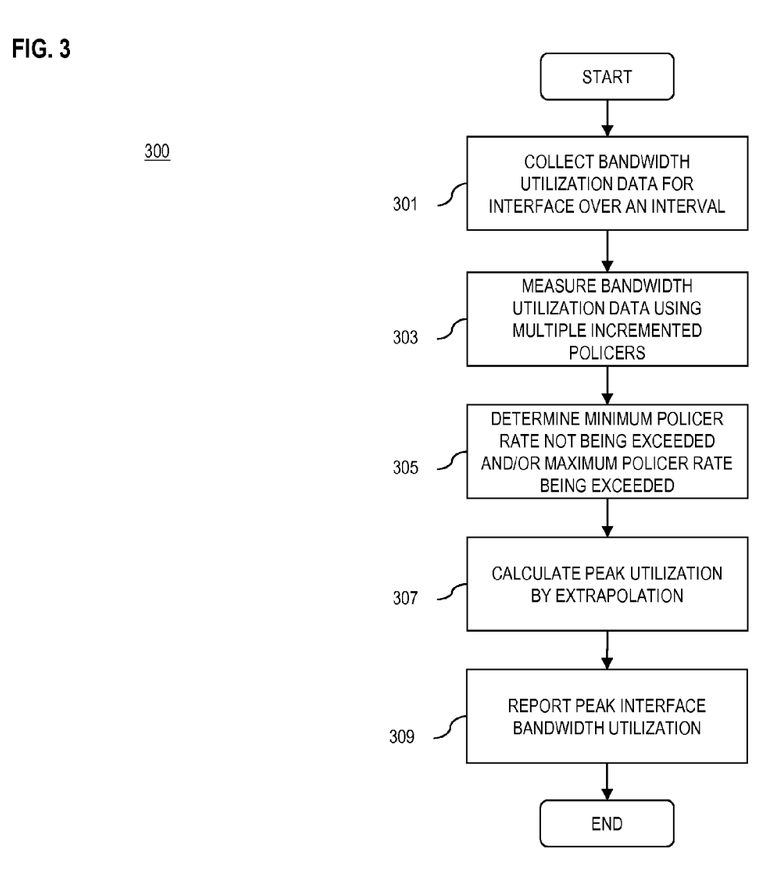
FIG. 3 is a flowchart of a process for measuring interface utilization using multiple policers, according to an exemplary embodiment.

FIG. 3 is a flowchart of a process for measuring interface utilization using multiple policers, according to an exemplary embodiment. In step 301, the traffic monitoring module 135 of the policers 125 collect bandwidth utilization data from the interface over an interval of time, and the policers 125 are used to measure the bandwidth utilization data in step 303. Thus, each incremented policer determines the number of red packets associated with the respective bandwidth increment for which it is assigned, and counts such bytes and packets. Then, in step 307, the analysis module 129 of the policers determines the minimum policer rate that is not being exceeded and/or the maximum policer rate being exceeded, thereby determining the range of bandwidth values in which peak interface bandwidth utilization has occurred (i.e., the minimum policer rate not exceed and the next lower incremented rate, or the maximum policer rate exceeded and the next higher incremented rate). Optionally, in order to obtain a finer measurement of the peak utilization value, in step 307, the peak utilization can be more precisely calculated by extrapolating between the range of values by assuming a linear relationship between red packets and peak interface bandwidth across the last bandwidth interval. In step 309, the peak interface bandwidth utilization can then be reported, for example, to network administrators in order to make any desired adjustments to the interface configuration.

As an example of such a process, a 10GE interface is considered. In the example, the 10GE interface has 512 MB of buffer, which supports about 400 ms of buffering (i.e., 512 MB/10 Gbps). With ten evenly incremented policers (n=10), the policers can be configured with the following values: CIR(1)=1 Gbps with CBS(1)=51.2 MB; . . . , CIR(10)=10 Gbps with CBS(10)=512 MB, where CIR(n)=n Gbps with CBS(n)=n$\times$51.2 MB. With a measurement interval of 60 seconds, a traffic flow with a repeating pattern of 5 Gbps for 1 second (625 MB over 1 s) followed by 2 second of silence would yield the following results, where Red(n) is the counter for the number of red bytes that exceeded CIR(n) with CBS (n).

$$\text{Red}(n) = [(1 - n/5) \times 625 \text{ MB} - n \times 51.2 \text{ MB}] \times 60/3$$

If Red(n)<0, then Red(n)=0. Note that Total Bytes=Red(0).
Red(0)=12.5 GB;
Red(1)=8.976 GB;
Red(2)=5.452 GB;
Red(3)=1.928 GB; and
Red(4) through Red(10)=0.

Thus, the interface peak bandwidth would be recorded as 4 Gbps ($\leq$4 Gbps), as the minimum policer rate not exceeded in step 305.

Bytes that came in at a rate between n Gbps and n+1 Gbps=Red(n+1)−Red(n):
0 to 1 Gbps=3.524 GB;
1 to 2 Gbps=3.524 GB;
2 to 3 Gbps=3.524 GB; and
3 to 4 Gbps=1.928 GB.

These values can be used to get a more precise value between 3 Gbps and 4 Gbps in step 307 as follows:

3 Gbps+1.928/3.524=3.547 Gbps.

Figure 4:
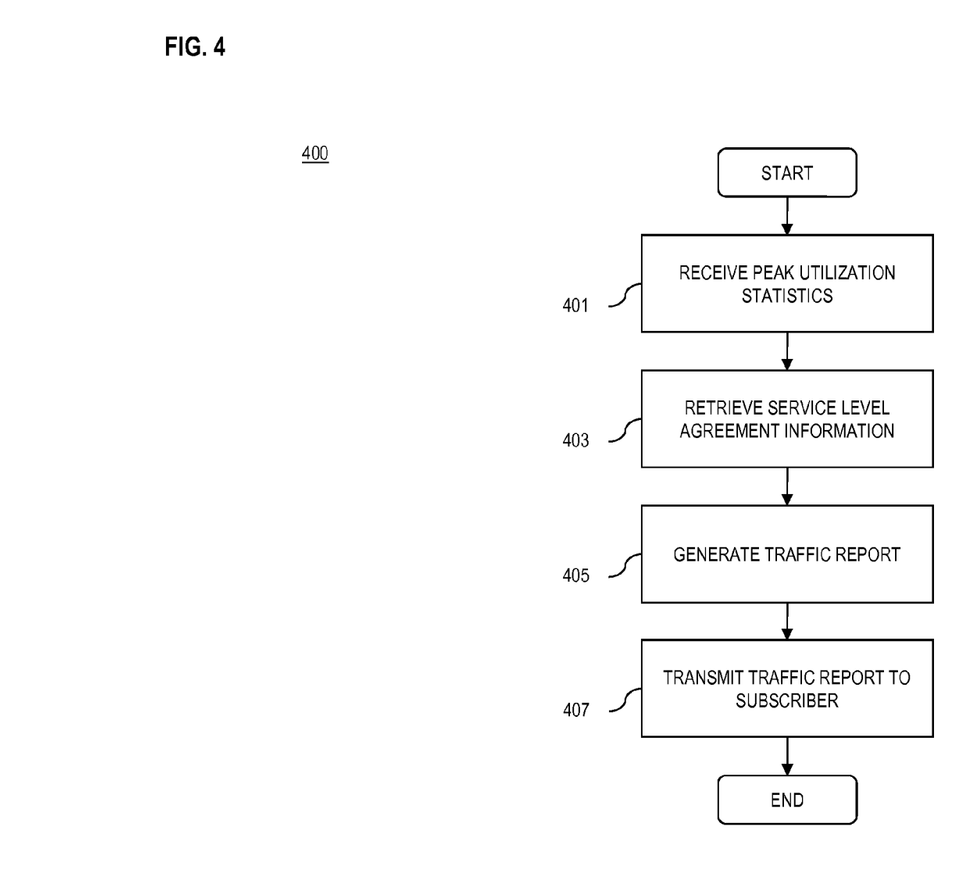
FIG. 4 is a flowchart of a process for generating traffic reports, according to an exemplary embodiment.

FIG. 4 is a flowchart of a process for generating traffic reports, according to an exemplary embodiment, as a process in which to report peak interface bandwidth utilization. For illustrative purposes, process is described with reference to FIG. 1. In step 401, reporting module 131 receives, from analysis module 129, statistics regarding peak utilization associated with a transmission source of a client, e.g., boundary node 113. Per step 403, reporting module 131 retrieves, via SLA interface module 133, SLA information corresponding to the client from SLA repository 127. Based on the statistics and the SLA information, reporting module 131 generates, during step 405, one or more traffic reports setting forth the peak utilization statistics gathered. At step 407, the generated traffic reports are transmitted to the client via, for example, a communication interface (not shown) of network management system 101. According to various embodiments, the traffic reports may be provided to the subscriber by electronic mail, facsimile, or postal mail. In other instances, the bursty traffic reports may be made accessible to the subscriber via a networked application (e.g., website). As such, the traffic reports may be "viewed" or "downloaded" by subscribers via a online graphical user interface (GUI) hosted by, for example, network management system 101.

Thus, a system and method of measuring peak interface utilization over very short time periods using groups of policers configured at different rates is provided. Such systems and methods can be utilized by customers or service providers who need to monitor trunk utilization to determine when to upgrade, service providers trying to do lossless oversubscription, service providers running traffic engineering, providers of such equipment sampling interface bandwidth, estimating bandwidth with policing, measuring peak bandwidth over short intervals, improving bandwidth polling intervals.

The processes described herein for measuring interface utilization may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
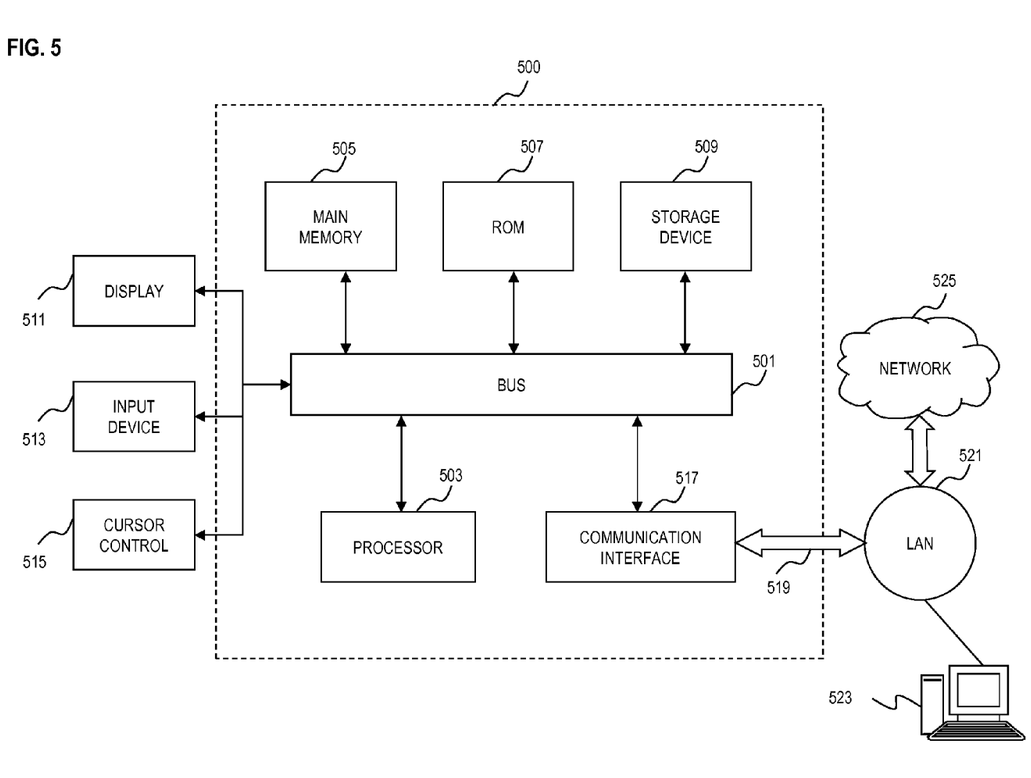
FIG. 5 is a diagram of a computer system that can be used to implement various exemplary embodiments

FIG. 5 illustrates computing hardware (e.g., computer system) 500 upon which an embodiment according to the invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving bandwidth utilization data from a plurality of policers configured to determine one or more red packets, wherein the plurality of policers are incremented at more frequent increments along a lower bandwidth level of an interface and at less frequent increments along a higher bandwidth level of the interface;
   determining a range of bandwidth values for which peak interface bandwidth utilization has occurred based on the bandwidth utilization data; and
   initiating traffic shaping at one or more boundary nodes corresponding to the policers using the determined range of bandwidth values.

2. A method according to claim 1, further comprising:
   determining a minimum policer rate of the respective plurality of policers that is not exceeded during a predetermined time interval.

3. A method according to claim 2, further comprising:
   determining a maximum policer rate of the respective plurality of policers that is exceeded during the time interval.

4. A method according to claim 3, further comprising:
   determining a peak utilization from the bandwidth utilization data by calculating the peak utilization using extrapolation between the minimum policer rate that is not exceeded during the time interval and the maximum policer rate that is exceeded during the time interval.

5. A method according to claim 1, wherein the plurality of policers measure the bandwidth utilization data by monitoring a committed information rate value of the interface and a committed burst size of the interface.

6. A method according to claim 1, wherein the plurality of policers are used to count bytes and packets traveling on the interface.

7. A method according to claim 6, wherein the interface is between a boundary node and an edge node, the method further comprising:
   determining to monitor a logical grouping of traffic, wherein the logical grouping including at least one of a physical port, a queue on a physical port, a sub-interface, a communication path, and a data flow.

8. An apparatus comprising:
   at least one processor; and
   at least one memory including computer program code for one or more programs,
   the at least one memory and the computer program code configured to, with the at least one processor, cause the apparatus to perform at least the following,
   receive bandwidth utilization data from a plurality of policers configured to determine one or more red packets, wherein the plurality of policers are incremented at more frequent increments along a lower bandwidth level of an interface and at less frequent increments along a higher bandwidth level of the interface,
   determine a range of bandwidth values for which peak interface bandwidth utilization has occurred based on the bandwidth utilization data, and
   initiate traffic shaping at one or more boundary nodes corresponding to the policers using the determined range of bandwidth values.

9. An apparatus according to claim 8, wherein the apparatus is further caused to:
   determine a minimum policer rate of the respective plurality of policers that is not exceeded during a predetermined time interval.

10. An apparatus according to claim 9, wherein the apparatus is further caused to:
    determining a maximum policer rate of the respective plurality of policers that is exceeded during the time interval.

11. An apparatus according to claim 10, wherein the apparatus is further caused to:
    determine a peak utilization from the bandwidth utilization data by calculating the peak utilization using extrapolation between the minimum policer rate that is not exceeded during the time interval and the maximum policer rate that is exceeded during the time interval.

12. An apparatus according to claim 8, wherein the plurality of policers measure the bandwidth utilization data by monitoring a committed information rate value of the interface and a committed burst size of the interface.

13. An apparatus according to claim 8, wherein the plurality of policers are used to count bytes and packets traveling on the interface.

14. An apparatus according to claim 13, wherein the interface is between a boundary node and an edge node, and the apparatus is further caused to:
   determine to monitor a logical grouping of traffic, wherein the logical grouping including at least one of a physical port, a queue on a physical port, a sub-interface, a communication path, and a data flow.

15. A system comprising:
   a plurality of policers configured to determine one or more red packets and measure bandwidth utilization data, wherein the plurality of policers are incremented at more frequent increments along a lower bandwidth level of an interface and at less frequent increments along a higher bandwidth level of the interface;
   an analysis module configured to determine a range of bandwidth values for which peak interface bandwidth utilization has occurred based on the bandwidth utilization data; and
   a shaping module configured to initiate traffic shaping at one or more boundary nodes corresponding to the policers using the determined range of bandwidth values.

16. A system according to claim 15, wherein the analysis module is further configured to determine a minimum policer rate of the respective plurality of policers that is not exceeded during a predetermined time interval.

17. A system according to claim 16, wherein the analysis module is further configured to determine a maximum policer rate of the respective plurality of policers that is exceeded during the time interval.

18. A system according to claim 17, wherein the analysis module is further configured to determine a peak utilization from the bandwidth utilization data by calculating the peak utilization using extrapolation between the minimum policer rate that is not exceeded during the time interval and the maximum policer rate that is exceeded during the time interval.

19. A system according to claim 15, wherein the plurality of policers measure the bandwidth utilization data by monitoring a committed information rate value of the interface and a committed burst size of the interface.

20. A system according to claim 15, wherein the plurality of policers are used to count bytes and packets traveling on the interface.

* * * * *